Figure 1:
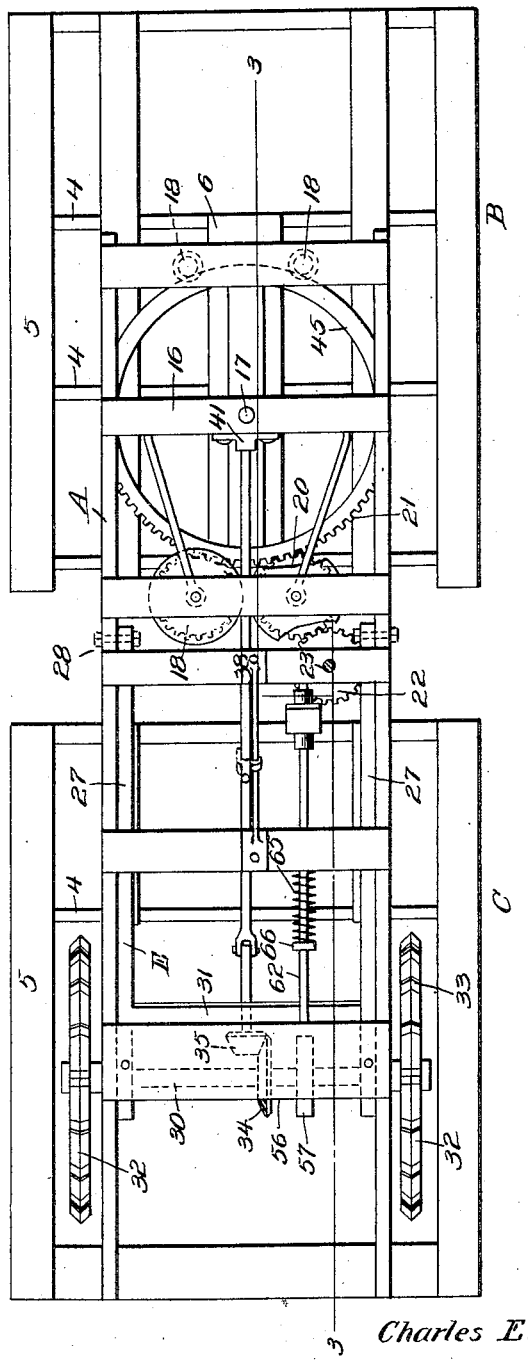

C. E. TETREAULT.
SELF PROPELLED SLEIGH.
APPLICATION FILED APR. 3, 1908.

902,345.

Patented Oct. 27, 1908.
3 SHEETS—SHEET 1.

Witnesses
F. C. Gibson.
C. Bradway.

Inventor
Charles E. Tetreault.

By Victor J. Evans
Attorney

C. E. TETREAULT.
SELF PROPELLED SLEIGH.
APPLICATION FILED APR. 3, 1908.
902,345.
Patented Oct. 27, 1908.
3 SHEETS—SHEET 2.
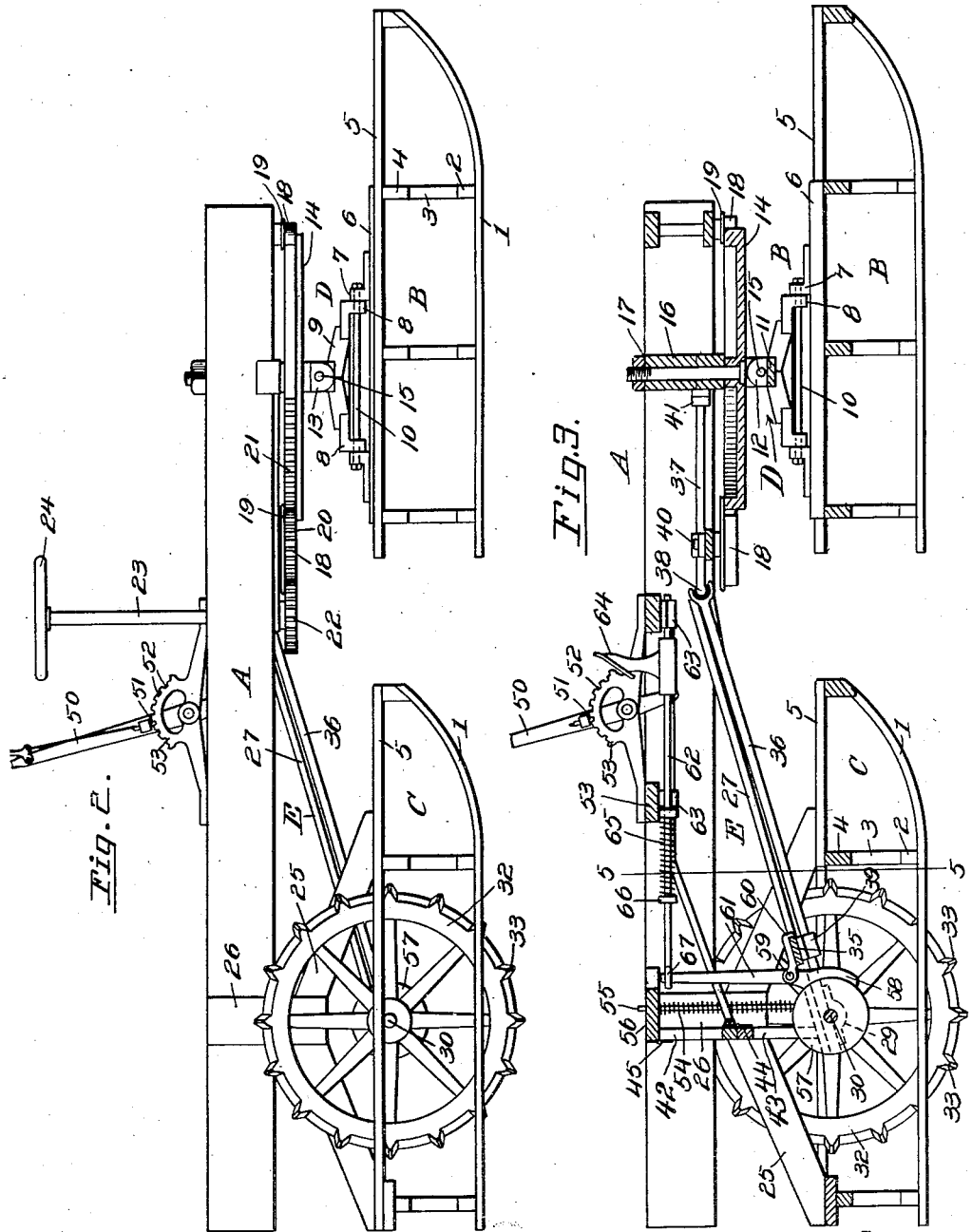
Witnesses
F. C. Gibson.
C. Bradway.
Inventor
Charles E. Tetreault.
By Victor J. Evans
Attorney C. E. TETREAULT.
SELF PROPELLED SLEIGH.
APPLICATION FILED APR. 3, 1908.
902,345.
Patented Oct. 27, 1908.
3 SHEETS—SHEET 3.
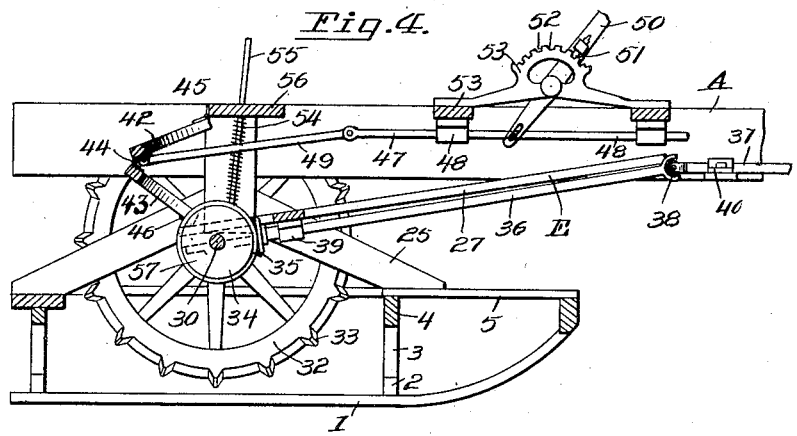
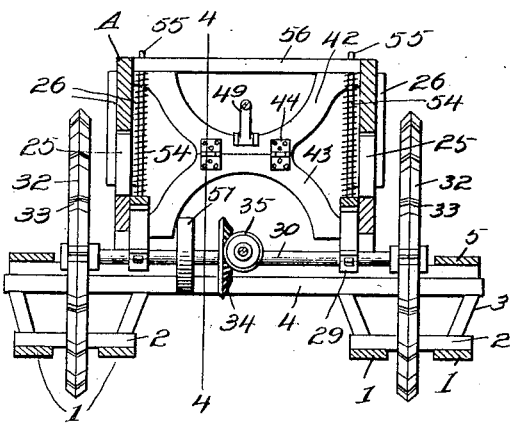
Witnesses
F. C. Gibson.
C. Bradway.
Inventor
Charles E. Tetreault.
By Victor J. Evans
Attorney

UNITED STATES PATENT OFFICE.

CHARLES E. TETREAULT, OF NEWPORT, VERMONT.

SELF-PROPELLED SLEIGH.

No. 902,345.　　　　　Specification of Letters Patent.　　　　Patented Oct. 27, 1908.

Application filed April 3, 1908. Serial No. 424,974.

*To all whom it may concern:*

Be it known that I, CHARLES E. TETREAULT, a citizen of the United States, residing at Newport, in the county of Orleans and State of Vermont, have invented new and useful Improvements in Self-Propelled Sleighs, of which the following is a specification.

This invention relates to self-propelled bob sleighs of that type provided with driving wheels mounted at the rear bob and adapted to be set to different positions, according to the condition of the road-bed, the driving wheels being operated by an engine or other motor.

The invention has for one of its objects to improve and simplify the construction and operation of devices of this character so as to be comparatively easy and inexpensive to manufacture, readily controlled, and efficient in use.

A further object of the invention is the provision of a sleigh comprising a body mounted on front and rear bobs, the front one of which being connected with the body so as to permit of universal movement so that the sleigh can pass over uneven places in the road with comparative smoothness, a steering gear being employed for turning the front bob to one side or the other for guiding the movement of the vehicle.

Another object of the invention is the provision of a propelling mechanism consisting of driving wheels arranged to be raised or lowered with respect to the runner of the rear bob, the driving axle for the wheels being supported on the frame of the vehicle by toggle elements which are straightened or collapsed by manually-actuated means conveniently within control of the operator for setting the wheels to best satisfy the requirements, the axle being equipped with a brake mechanism for controlling the speed of the vehicle in descending grades.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a plan view of the sleigh. Fig. 2 is a side view thereof. Fig. 3 is a longitudinal section on line 3—3, Fig. 1. Fig. 4 is a vertical sectional view on line 4—4, Fig. 5, showing the driving wheels thrown to inoperative position. Fig. 5 is a transverse sectional view on line 5—5, Fig. 3.

Similar reference characters are employed to designate corresponding parts throughout the several views.

Referring to the drawings, A designates a body of any desired construction which is supported on front and rear bobs B and C. Each bob is composed of two runners composed of a pair of shoes 1 connected together and held in spaced relation by cross pieces 2 and attached to knees 3, the knees being secured to horizontal cross members 4 that extend from one runner to the other and serve to hold the runners spaced apart in transverse relation. The cross pieces 4 are held in fixed position relatively to each other by longitudinally-extending members 5.

The bob B is connected with the front of the frame A by a universal joint D. On the top of the front bob is a plate 6 from which rise apertured ears or lugs 7 arranged spaced apart in a central longitudinal line and between which depend apertured lugs 8 on the connector 9, and extending through the apertures of these lugs is a bar 10 forming a pintle. The connector 9 has transversely-extending arms 11 on the extremities of which are upwardly-extending apertured lugs 12 that engage between depending apertured lugs 13 on the under side of the rotatable element or wheel 14, and passing through these apertured lugs is a transversely-extending rod 15 that forms a pintle that is disposed at right angles to the pintle 10, whereby the front bob is capable of tilting in a transverse as well as a longitudinal plane, and thus accommodate itself to the uneven places and obstructions in the roadway. The element 14 forms a fifth wheel that is secured to a cross piece 16 on the body A by means of a king bolt 17 that passes through the center of the wheel and vertically through the cross bar 16. Engaging the periphery of this wheel at different points are rollers 18 that have annular flanges 19 that bear on the top surface of the wheel, thereby giving several points of support for the body on the wheel, and these rollers serve to take the thrusts in different directions so as to thereby relieve the king bolt of undue strain, the rollers being mounted on the body in any suitable manner. The rear rollers 18 are larger than the front rollers and one of the rear rollers is provided with teeth 20 for meshing with a segmental rack 21 on the rear half of the fifth wheel 14 and with such toothed roller meshes a pinion 22 mounted on the bottom end of a vertical steering post 23 carried by the vehicle body A and equipped with a hand wheel 24 so as to be conveniently operated.

The rear end of the body A is supported on the runners of the rear bob C by inverted V-shaped brackets 25 to which the body is secured by plates 26. Disposed between these brackets is a swinging axle-carrying frame E composed of side members 27 that are pivotally secured to the sides of the body by bolts 28 or equivalent fastenings, as shown in Fig. 1, and on the rear ends of these members are bearings 29 for carrying the live axle 30, and the members 27 are connected and braced one on the other by a cross piece 31. Secured to the ends of the axle are driving wheels 32 that have radial spurs 33 formed on their peripheries so as to effectively grip the surface over which the sleigh travels. On the axle 30 is a bevel gear 34 with which a pinion 35 meshes for rotating the axle, the said pinion being mounted on a driving shaft consisting of two sections 36 and 37 that are connected by a universal joint 38. The section 36 of the driving shaft is mounted in a bearing 39 on the cross piece 31 of the frame E so as to swing with the frame, and the section 37 is mounted in bearings 40 and 41 on the frame A and is adapted to be driven by an engine (not shown) suitably mounted on the vehicle body. The center of the universal joint 38 is arranged to coincide with the pivots 28 on which the frame swings.

The axle 30 is adapted to be raised or lowered so as to set the driving wheels to suit the operating conditions; that is to say, when the snow of the road-bed is comparatively soft, the wheels will be depressed to a greater extent so as to penetrate far enough to engage the relatively hard roadbed under the snow, and when the snow is beaten hard or formed into ice, the wheels will be depressed to a lesser degree. For this purpose, the frame E is supported at its rear on the body A by toggle elements 42 and 43 connected together by hinges 44, and to the body A and frame E by hinges 45 and 46 respectively, as clearly shown in Fig. 4. When the toggle elements are straightened as shown in Figs. 3 and 5, the driving wheels are projected to the full extent below the runners of the rear bob, and when the toggle elements are fully collapsed as shown in Fig. 4, the wheels will be raised out of engagement with the surface over which the sleigh passes, as for instance, when the sleigh is coasting down grade. The toggle device is actuated by a reciprocatory rod 47 mounted in bearings 48 on the body A and connected with the element 42 by a link 49, the rod 47 being actuated by a lever or any other suitable arrangement, for instance, an operating lever 50 suitably mounted on the body A and connected with the rod 47, so that the operator can readily actuate the wheel-shifting mechanism, and on the lever may be arranged a latch 51 adapted to engage in notches 52 of a bracket 53 whereby the wheels can be locked in either extreme position. When the road-bed is relatively hard, the wheels can be held in driving engagement therewith by springs or other suitable means 54 acting in connection with the weight of the wheels, axle and frame. These springs are arranged on rods 55 rising from the frame E passing through a cross piece 56 on the frame, the upper ends of the springs bearing on the said cross piece, while the lower ends bear on the frame E so as to urge the latter downwardly.

In order to stop the vehicle or slacken the speed thereof, a brake drum 57 is arranged on the driving axle, and coöperating therewith is a shoe or gripping element 58, Fig. 3, pivoted at 59 on a bracket 60 carried by the frame E, the shoe being connected with a lever 61 that extends upwardly and is engaged by a reciprocatory rod 62. The rod 62 is mounted in bearings 63, and on the rod is a pedal 64 which, upon being pushed forwardly by the operator, will set the brake shoe. The brake shoe is held out of engagement with the drum by a spring 65 on the rod 62 and interposed between the collar 66 and one of the bearings 63. The rear end of the rod 62 is provided with a slot 67 into which the lever 61 extends, whereby the lever can freely rise and fall with the frame E.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims.

Having thus described the invention, what I claim is:—

1. In a self-propelled sleigh, the combination of a body, bobs supporting the body, a frame supported on the body, means for pivoting the front of the frame to the body at a point between the bobs, an axle carried by the frame on the rear part thereof, surface-engaging driving wheels on the axle, a toggle device connected with the frame at a point adjacent the axle and with the body at a point above the axle, manually-controlled means connected with the toggle device for setting the driving wheels in different positions, and a brake device including a drum on the axle and manually-controlled means for engaging the drum.

2. In a self-propelled sleigh, the combination of a body, front and rear bobs for supporting the same, a swinging frame pivoted at its forward end on the body at a point between the bobs, a driving axle on the rear end of the frame and directly over the rear bob, means connected with the frame for raising and lowering the same, driving wheels on the axle, a driving shaft consisting of two parts, one part being mounted on the body and the other on the frame, and a universal joint between the sections and disposed in line with the pivot on which the frame swings.

3. In a self-propelled vehicle, the combination of a body, runners mounted thereon, a swinging frame, toggle elements hingedly connected with the frame and body, means connected with the elements for moving the frame, an axle carried by the frame, driving wheels on the axle, a driving shaft extending longitudinally of the body and geared to the axle and arranged to swing on a center concentric with the axis on which the frame swings and yielding devices arranged to urge the frame downwardly.

4. In a self-propelled vehicle, the combination of a body, a bob including runners each composed of spaced shoes, cross pieces connecting the shoes together, horizontal cross members connecting the runners together in fixed relation, a bodily moving driving axle and of such length as to extend from one runner to the other, driving wheels on the axle and disposed between the shoes of each runner, means for rotating the axle, and means for raising and lowering the axle for changing the set of the wheels.

5. In a self-propelled sleigh, the combination of a body, front and rear bobs supporting the same, a propelling mechanism, a king bolt, a rotatable element on the king bolt, a universal connection between the element and front bob, and a steering device operating through the element for moving the front bob, said connection including two pivots disposed at right angles to each other, and a connecting member between the pivots.

6. In a self-propelled sleigh, the combination of a body, bobs supporting the same, a propelling mechanism, a king bolt, a rotatable element thereon, rollers disposed around and engaging the periphery of the element, means for mounting the rollers on the body, teeth on one of the rollers, a pinion meshing with teeth, manually-operated means for actuating the pinion to steer the sleigh, a connector, and right-angularly disposed pintles connecting the connector with the said element and front bob respectively.

In testimony whereof 1 affix my signature in presence of two witnesses.

CHARLES E. TETREAULT.

Witnesses:
OSCAR G. PROUT,
HOMER THRASHER.